No. 811,093. PATENTED JAN. 30, 1906.
W. L. ROBERTS.
LOCK NUT.
APPLICATION FILED AUG. 7, 1905.
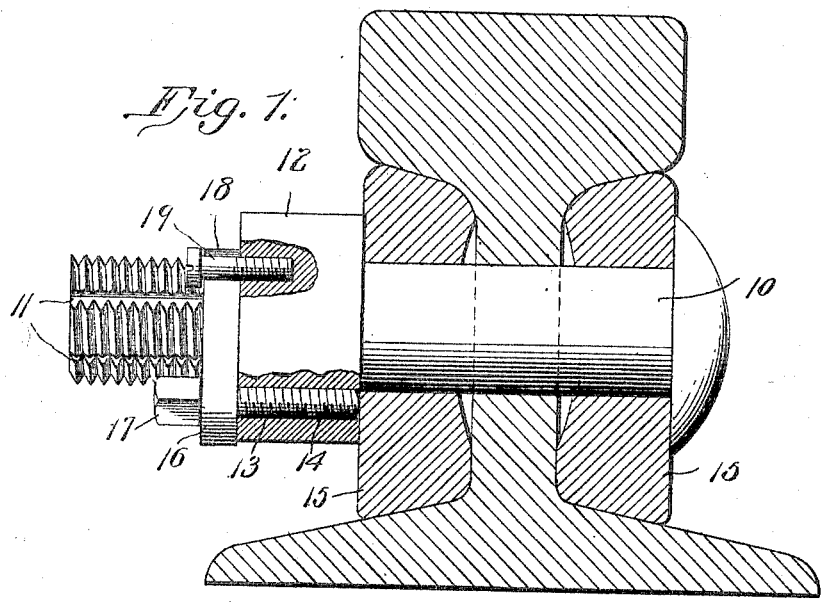
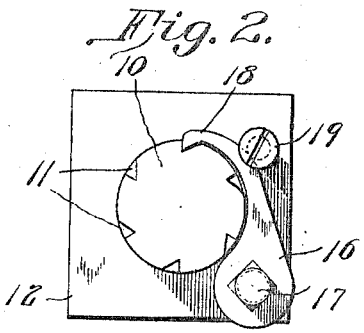
Witnesses
William L. Roberts,
Inventor.
by
Attorneys

UNITED STATES PATENT OFFICE.

WILLIAM LEE ROBERTS, OF NORFIELD, MISSISSIPPI.

LOCK-NUT.

No. 811,093.     Specification of Letters Patent.     Patented Jan. 30, 1906.

Application filed August 7, 1905. Serial No. 273,092.

*To all whom it may concern:*

Be it known that I, WILLIAM LEE ROBERTS, a citizen of the United States, residing at Norfield, in the county of Lincoln and State of Mississippi, have invented a new and useful Lock-Nut, of which the following is a specification.

This invention relates to lock-nuts, and has for its object to improve the construction and increase the efficiency and utility of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a transverse section of a railway-rail joint with the improved device applied. Fig. 2 is a plan view of the improved device detached.

Like characters of reference designate corresponding parts throughout both views.

The improved device herein described and shown is designed more particularly for locking the nuts of the clamp-bolts of railway-rail joints and for the purpose of illustration is shown thus applied; but the device is capable of use upon any form of bolt and nut and upon any of the various structures requiring the locking of the nuts to prevent retrograde movement.

In the improved device the bolt represented at 10 is provided with longitudinal grooves 11 at its threaded end, and the nut 12 is provided with a threaded aperture 13, parallel to its main bolt-engaging aperture. The aperture 13 will be arranged in one of the corners of the nut and as far from the bolt-aperture as practicable to avoid weakening the nut. Engaging the aperture 13 is a set-screw 14, extending entirely through the nut and bearing by its inner end against the structure which the bolt is employed to secure, in the drawings one of the clamp-plates 15 of a railway-rail joint, while a detent or pawl 16 is mounted to swing upon the outer end of the set-screw and held in place thereon by the wrench-head 17 of the set-screw. The free end 18 of the detent is hook-shaped for engaging one of the grooves 11, and thus preventing retrograde movement of the nut. A stop member 19, preferably in the form of a threaded stud, is inserted into the body of the nut in the rear of the detent to hold the same immovably in engagement with the bolt, while at the same time easily releasable when required. The stop member is formed with a screw-driver groove, or it may be square to receive a wrench for inserting or detaching the same, and the head 17 of the set-screw may also be provided with a screw-driver groove or formed square to receive a wrench, as may be preferred.

In applying the device the stop member 19 is detached and the set-screw 14 turned backward a few turns to withdraw the inner end into the nut. The nut 12 is then applied to the bolt 10 and set "home" against the clamp-plate 15 or other structure which the nut is required to secure in the ordinary manner. The detent is then engaged at its hooked end 18 with the nearest of the channels 11 in the bolt, and, if necessary, the nut is rotated slightly to bring the channel in proper position. The set-screw 14 is then rotated by a wrench or other implement, as the case may be, to cause its inner end to bear firmly against the member 15 and also to cause its head 17 to bear upon the hub of the detent and firmly clamp the same in position. Thus the nut is very firmly held in position upon the structure 15 and also upon the bolt 10. As an additional securing means and to obviate any possibility of the detent becoming accidentally disengaged by the jarring or concussions to which it may be subjected the stop-pin 19 is provided, as above noted.

With a nut and bolt thus constructed and applied it will be obvious that the nut may be firmly locked in position and effectually prevented from retrograde movement or loosening upon the bolt no matter how severe or prolonged the jars and concussions may be to which the same is subjected when in use. It will also be obvious that a twofold or double "grip" is provided for the nut, which very materially increases the efficiency and value of the device.

Having thus described the invention, what is claimed is—

1. In a nut-lock the combination with a bolt having a plurality of spaced channels disposed transversely of its threads, a nut engaging the threaded end of the bolt and provided with a threaded aperture extending entirely through the nut parallel to the bolt-receiving aperture therein, a set-screw engaging said threaded aperture and bearing against the face of the structure upon which the nut bears, and a detent swinging upon the outer end of said set-screw and engaging said bolt-channels one at a time by its free end, the detent being clamped in position upon the nut and the nut being clamped in position upon the structure upon which it bears by the action of the set-screw.

2. In a nut-lock the combination with a bolt having a plurality of spaced channels disposed transversely of its threads, a nut engaging the threaded end of the bolt and provided with a threaded aperture extending entirely through the nut parallel to the bolt-receiving aperture therein, a set-screw engaging said threaded aperture and bearing against the face of the structure upon which the nut bears, a detent swinging upon the outer end of said set-screw and engaging said bolt-channels one at a time by its free end, and a stop-pin adapted to be inserted in said nut rearwardly of said detent when the detent is in engagement with the bolt.

In testimony that I claim the foregoing as my own I have hereto affixed my signature in the presence of two witnesses.

WILLIAM LEE ROBERTS.

Witnesses:
THAD S. LAIRD,
J. H. YAURN.